United States Patent
Ueda et al.

[11] Patent Number: 6,156,201
[45] Date of Patent: Dec. 5, 2000

[54] FUEL FILTER WITH RETURN PATH FOR REDUCING ELECTRICAL CHARGE BUILDUP

[75] Inventors: Hironori Ueda; Takashi Nagai; Nobuo Suzuki; Tadao Horiuchi, all of Obu, Japan

[73] Assignee: Aisan Kogyo Kabushiki Kaisha, Obu, Japan

[21] Appl. No.: 09/011,756

[22] PCT Filed: Jul. 22, 1997

[86] PCT No.: PCT/JP97/02517

§ 371 Date: Jul. 25, 1998

§ 102(e) Date: Feb. 25, 1998

[87] PCT Pub. No.: WO98/03787

PCT Pub. Date: Jan. 29, 1998

[30] Foreign Application Priority Data

Jul. 23, 1996  [JP]  Japan .................................. 8-193462
Nov. 14, 1996  [JP]  Japan .................................. 8-303126

[51] Int. Cl.$^7$ .................................................. B01D 29/00
[52] U.S. Cl. ...................... 210/416.4; 210/440; 210/109; 123/506; 123/514; 417/312
[58] Field of Search ................................ 210/243, 416.4, 210/172, 440, 116, 109; 123/497, 506, 514; 417/312, 313; 361/215

[56] References Cited

U.S. PATENT DOCUMENTS

| | | | |
|---|---|---|---|
| 4,592,836 | 6/1986 | Chiao | ...................... 210/168 |
| 5,367,998 | 11/1994 | Shiohara et al. | . |
| 5,613,476 | 3/1997 | Oi et al. | . |
| 5,649,514 | 7/1997 | Okada et al. | ........................ 123/514 |
| 5,782,223 | 7/1998 | Yamashita et al. | . |

FOREIGN PATENT DOCUMENTS

| | | |
|---|---|---|
| 0166160 | 1/1986 | European Pat. Off. . |
| 0702142 | 3/1996 | European Pat. Off. . |
| 0898073 | 2/1999 | European Pat. Off. . |
| 4433301 | 3/1996 | Germany . |
| 19509143 | 9/1996 | Germany . |
| 43105054 | 5/1991 | Japan . |
| 4-109465 | 4/1992 | Japan . |
| 6-500373 | 5/1998 | Japan . |
| 2304821 | 3/1997 | United Kingdom . |

*Primary Examiner*—W. L. Walker
*Assistant Examiner*—Terry K. Cecil
*Attorney, Agent, or Firm*—Dennison, Scheiner, Schultz & Wakeman

[57] ABSTRACT

A fuel filter (10) has a filter case (11), and a return path (25) is provided on the upper surface of the filter case (11). Return fuel discharged from a pressure regulator is supplied to the return path (25). The return path (25) having a closed lower end is provided with branch paths (26). The return fuel supplied to the return path (25) passes through the branch paths (26) and flows down into fuel reservoir along the outside peripheral surface of the filter case (11). Electrical charge on the surface of the filter case (11) is reduced when the return fuel flows along the outside peripheral surface of the filter case (11). Kinetic energy of the return fuel is reduced by the energy absorbing effect of the return path (25), the energy distributing effect of the branch paths (26), and the energy absorbing effect when the return fuel flows down along the outside peripheral surface of the filter case. Thus, fuel return sound waves from the returning fuel dropping into the fuel reservoir are reduced.

16 Claims, 8 Drawing Sheets

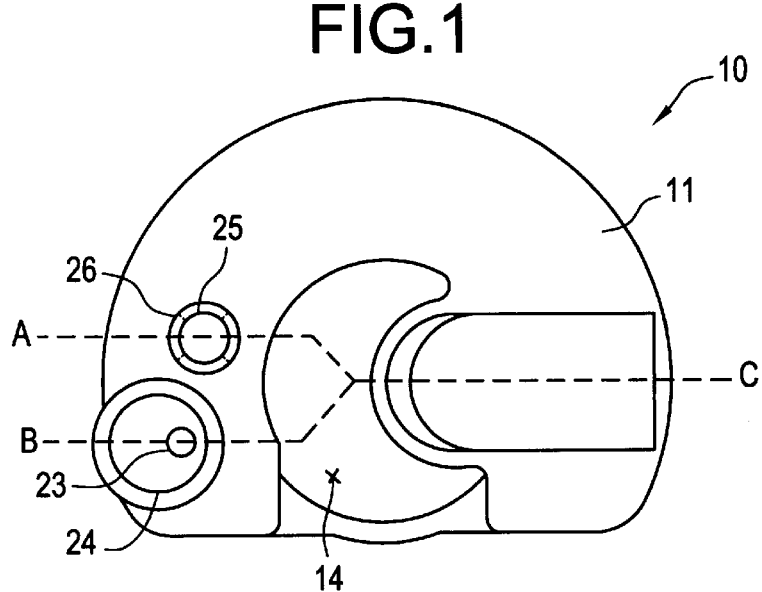
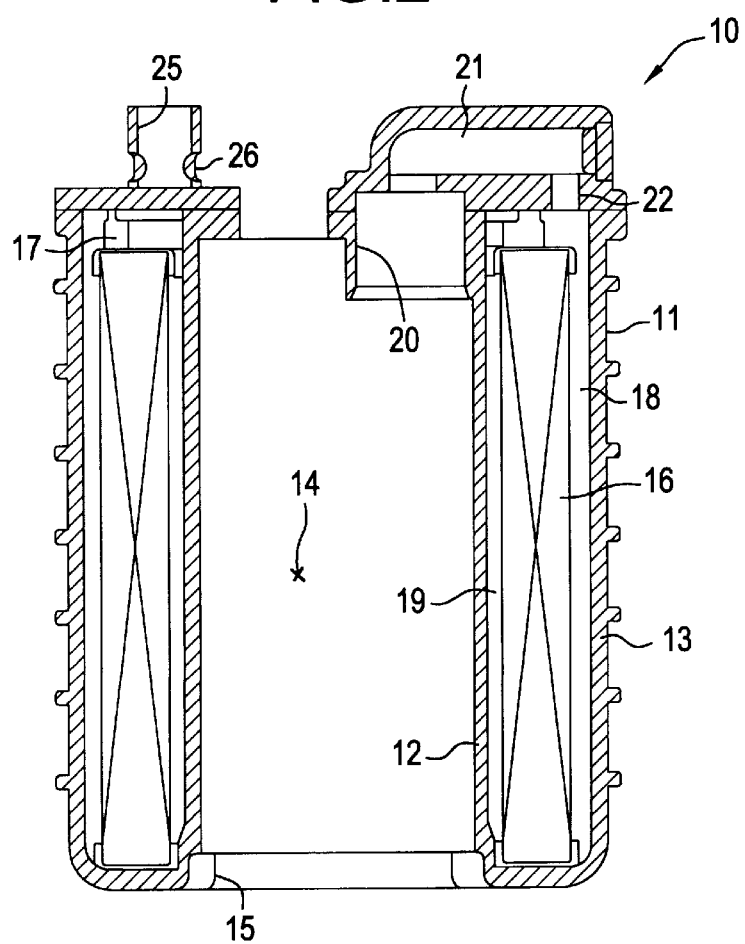

FUEL FILTER WITH RETURN PATH FOR REDUCING ELECTRICAL CHARGE BUILDUP

TECHNICAL FIELD

This invention relates to a fuel filter for filtering impurities from fuel delivered from a fuel tank by a fuel pump.

TECHNICAL BACKGROUND

As disclosed in Japanese Laid-Open Utility Model Publication No. 4-109465, it has been well known that a fuel pump and a fuel filter for filtering impurities from fuel delivered from a fuel tank by the fuel pump can be integrally formed to be inserted into the fuel tank.

Further, it also has been well known that a pump module constructed by assembling a fuel pump and a fuel filter together can be inserted into a fuel tank.

When the fuel passes through the fuel filter, a surface of a filter case becomes electrically charged due to frictional electrification between the fuel and the fuel filter and due to fluid electrification between the fuel and the filter case. The magnitude of the electric charge or electrifying potential of the fuel case is proportional to the fuel flow rate through the fuel filter.

The electric charge does not readily build up on the surface of the filter case when the filter case is immersed in the fuel reservoir in the fuel tank. However, electric charge tends to readily build up as the amount of fuel remaining in the tank becomes less.

When electric charge builds up on the surface of the filter case, there is a possibility of generating a spark between the fuel tank and the filter case. This possibility becomes high when the pump module is removed from the fuel tank for repair work.

In the conventional arts, as disclosed in the Japanese Publication No. 6-500373, a conductive path is provided between the filter case and a vehicle body in order to prevent electric charge from building up on the surface of the filter case. However, when this technique is used for a fuel filter that is inserted into the fuel tank, provision of the conductive path between the filter case and the fuel tank complicates the device construction and decreases assembling efficiency.

On the other hand, in a conventional design disclosed in Japanese Laid-Open Utility Model Publication No. 4-109465, the discharge port of a return pipe is connected to a pressure regulator which is mounted in a fuel tank so that fuel returning from the pressure regulator may be dropped into the fuel reservoir from the discharge port of the return pipe.

The return fuel has kinetic energy when being dropped onto the surface of the fuel reservoir, and fuel return sound waves are generated upon impact.

The magnitude of the fuel return sound waves increases as the distance between the discharge port of the return pipe and the surface of the fuel reservoir increases, which results when the liquid surface lowers. This sound wave is transmitted through the fuel tank to the outside as noise.

Transmission of the fuel return sound waves to the outside can be reduced by constructing the fuel tank from a material having good sound insulating properties or by covering the fuel tank with a sound insulating material. However, these measures increase manufacturing costs and decrease assembling efficiency.

In order to solve the above problem, various studies have been made. As a result, the inventors of the present invention have found that electric charge generated on the surface of the filter case can be decreased by directing the return fuel to flow along a side of the filter case. In addition, the inventors have found that return sound waves can be reduced by this design.

Accordingly, an object of the present invention is to provide a fuel filter having a simple construction in which electric charge buildup on the surface of the filter case can be avoided at low cost, and in which return sound waves also can be reduced.

SUMMARY OF THE INVENTION

The invention is directed to a fuel filter comprising a filter case which has a fuel inlet and a fuel outlet, a filter element which is provided within the filter case, and a fuel return passage which is integrally provided with the filter case.

According to the invention, electric charge on the surface of the filter case is decreased when the return fuel flows through a fuel return passage integrally provided with the filter case, which thus avoids electric charge buildup on the surface of the filter case, and further avoids generation of sparks. Further, the energy of the return fuel is reduced when returned through the fuel return passage, thus reducing fuel return sound waves.

In a further embodiment, the invention is directed to the fuel filter wherein the fuel return passage has a fuel discharge port at its lower part and is disposed along the side surface of the filter case.

In this embodiment the return fuel is delivered to the fuel reservoir by flowing along the filter case, thereby decreasing both electric charge buildup on the surface of the filter case and fuel return sound waves.

In a further embodiment, the invention is directed to the fuel filter wherein the fuel return passage includes a return path provided on the upper part of the filter case and branch paths branched from the return path.

In this embodiment, the fuel return passage is easily constructed. Further, providing a plurality of branch paths improves the effect of decreasing electric charge on the surface of the filter case. And further, kinetic energy of the return fuel is absorbed when the return fuel passes through the return path and when the return fuel is branched from the return path into the branched paths, thus improving the effect of decreasing fuel return sound waves.

The invention defined in claim 4 is the fuel filter of claim 3 wherein the return path is provided along the upper surface of the filter case.

In the invention of claim 4, branch paths can be provided at desired positions within the fuel return passage which is formed along the upper surface of the filter case, so that the return fuel may flow to cover the entire surface of the filter case, thus improving the effect of decreasing electric charge buildup on the surface of the filter.

In a further embodiment, the invention is directed to the fuel filter of wherein a pressure regulator is mounted on the filter case.

In this embodiment, the mounting operation for the pressure regulator and the piping operation for the return pipe are simplified.

BRIEF DESCRIPTION OF THE DRAWINGS

FIG. 1 is a plan view of a fuel filter constructed according to a first embodiment of the present invention.

FIG. 2 is a vertical sectional view taken along line A–C of FIG. 1.

EMBODIMENTS OF THE PRESENT INVENTION

Embodiment 1

A first embodiment of the present invention will now be described with reference to FIGS. 1 to 3.

Figure 3:
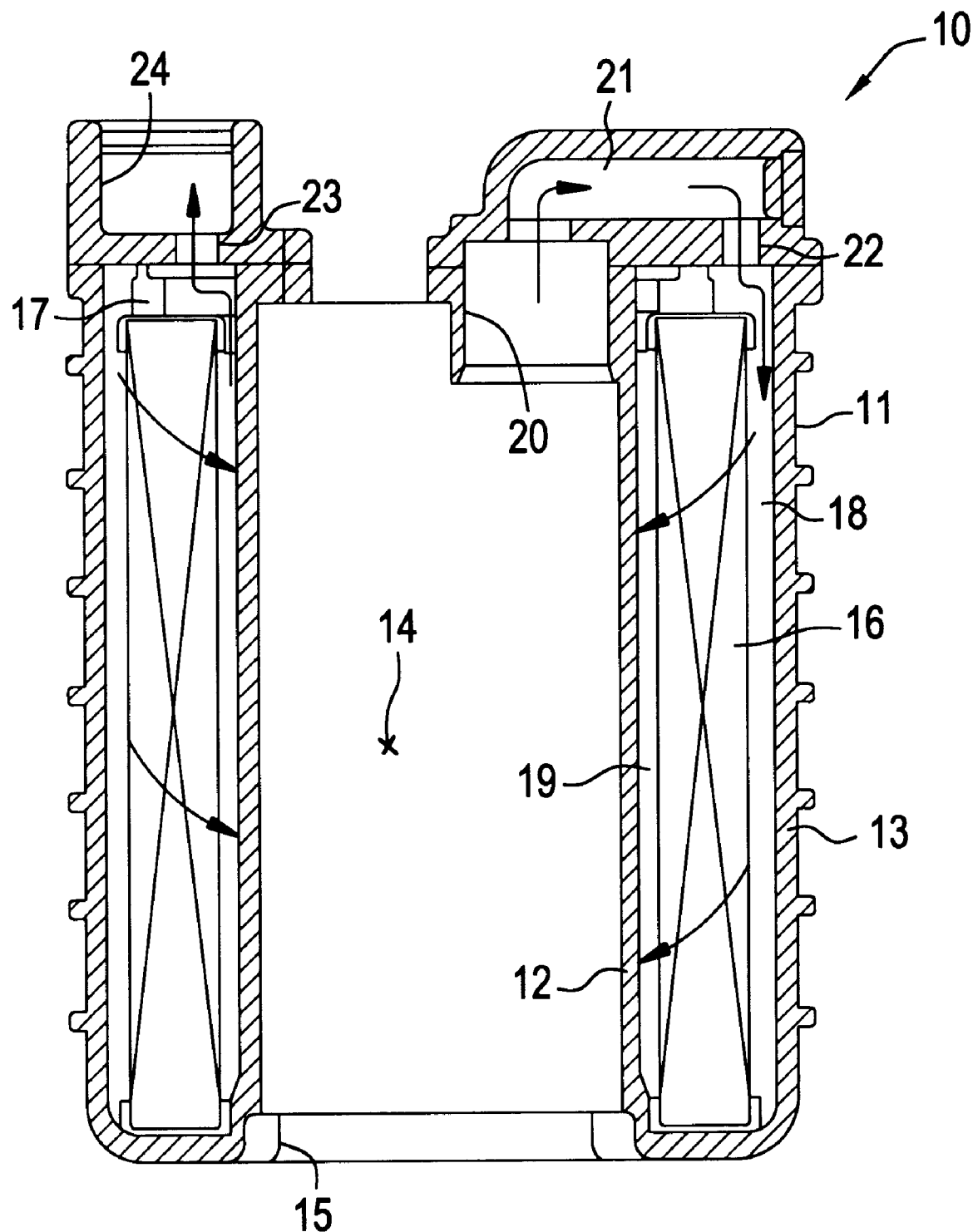
FIG. 3 is a vertical sectional view taken along line B–C of FIG. 1.

As shown in FIGS. 1 to 3, a fuel filter 10 comprises a filter case 11 made of synthetic resin or other like material. The filter case includes an inner peripheral wall 12 and an outer peripheral wall 13. The inner peripheral wall 12 has a fuel pump inserting portion 14 with a port 15 for inserting a fuel pump.

Although the filter case 11 is formed into a D-shape in this embodiment, cylindrical or other shapes also may be used.

Between the inner peripheral wall 12 and the outer peripheral wall 13, a filter element 16 is provided to remove impurities in fuel delivered from the fuel pump. The filter element 16 of this embodiment is a filter medium sheet which is pleated and curved to have a C-shaped cross-section, although other materials or shapes may be used therefor.

The filter element 16 is mounted in the filter case 11 via a sealing member 17 such that a fuel inlet chamber and a fuel outlet chamber may be formed on the outer peripheral side and on the inner peripheral side of the filter element 16. In this embodiment, a fuel inlet chamber 18 is formed on the outer peripheral side of the filter element 16 and a fuel outlet chamber 19 is formed on the inner peripheral side thereof.

The construction of the sealing member 17 may be modified in accordance with the construction of the filter element 16 that is used. As in the above embodiment, when using the filter element 16 having a pleated filter medium sheet that is curved to have a C-shaped cross-section, the sealing member 17 is constructed to seal the inside peripheral surface and the outside peripheral surface of the filter element 16. On the other hand, when using a filter element having a cylindrical filtering medium that is curved to have an O-shaped cross-section, the sealing member is constructed to seal the axial upper part and the axial lower part of the filter element. However, when the filter element 16 or the filter case 11 includes a sealing function, no additional sealing member 17 is required.

The filter case 11 is provided with an inlet mounting hole 20. The fuel pump is inserted into the fuel inserting portion 14. A delivery port of the fuel pump is inserted into the inlet mounting hole 20 of the filter case 11. The inlet mounting hole 20 communicates through a fuel path 21 and a fuel inlet port 22 with the fuel inlet chamber 18.

The filter case 11 is provided with an outlet mounting hole 24 which connects to a pressure regulator or a fuel supply pipe for supplying fuel to a main pipe. The outlet mounting hole 24 communicates through a fuel outlet port 23 with the fuel outlet chamber 19.

A return path 25 is provided on the upper surface of the filter case and is supplied with return fuel from the return pipe or the pressure regulator.

The return path 25 has a closed lower end and includes branch paths 26 branching from the return path 25. The desired number of branch paths 26 extend along the upper surface or to the outside surface (inner outside periphery or outer outside periphery) of the filter case. The return path 25 and the branch paths 26 constitute a fuel return passage.

Preferably, the return path 25 and the branch paths 26 are integrally formed from a synthetic resin together with the filter case.

Figure 4:
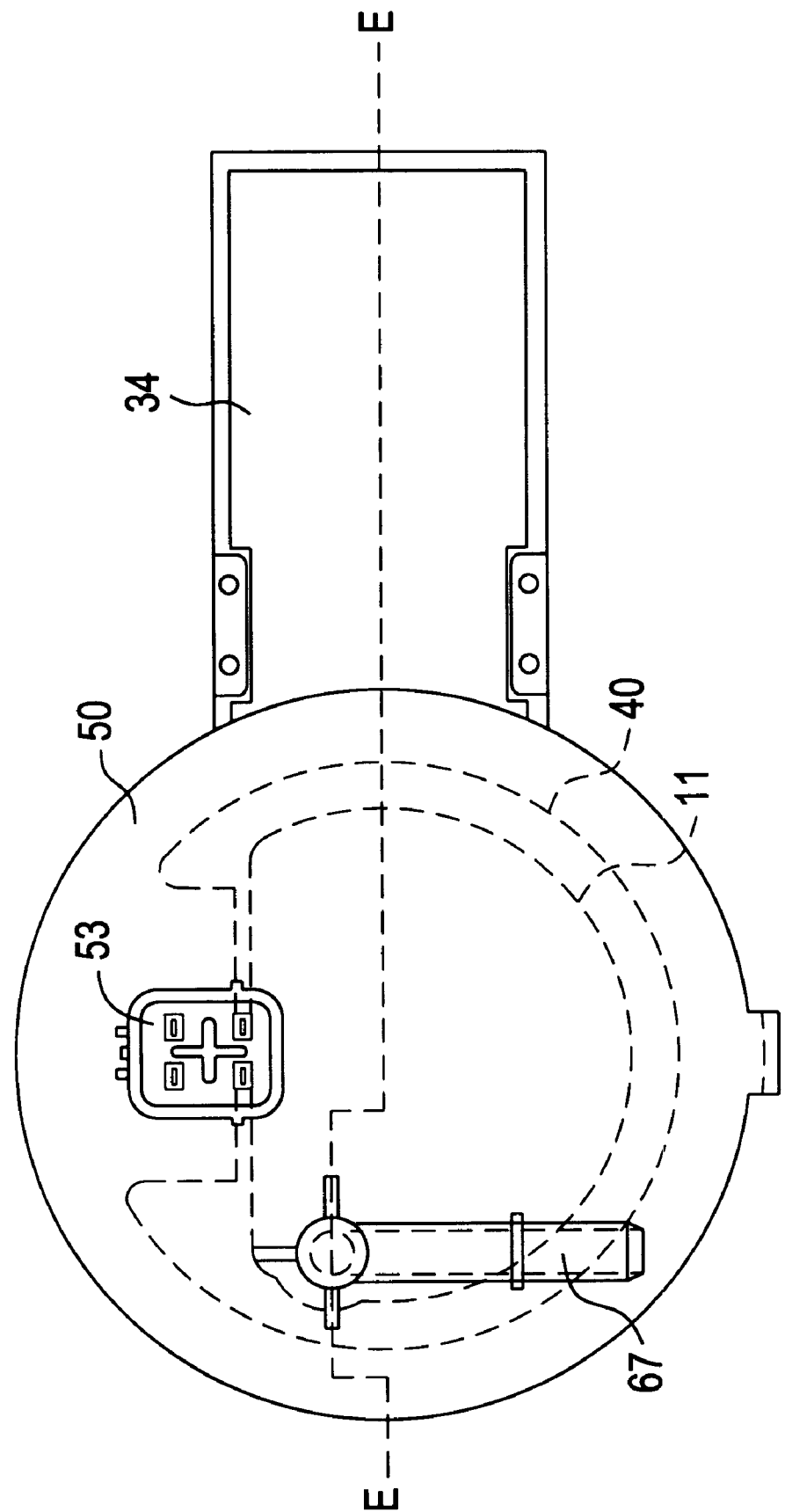
FIG. 4 is a view showing a pump module in which a fuel pump and a pressure regulator are assembled with the fuel filter of the first embodiment.
Figure 5:
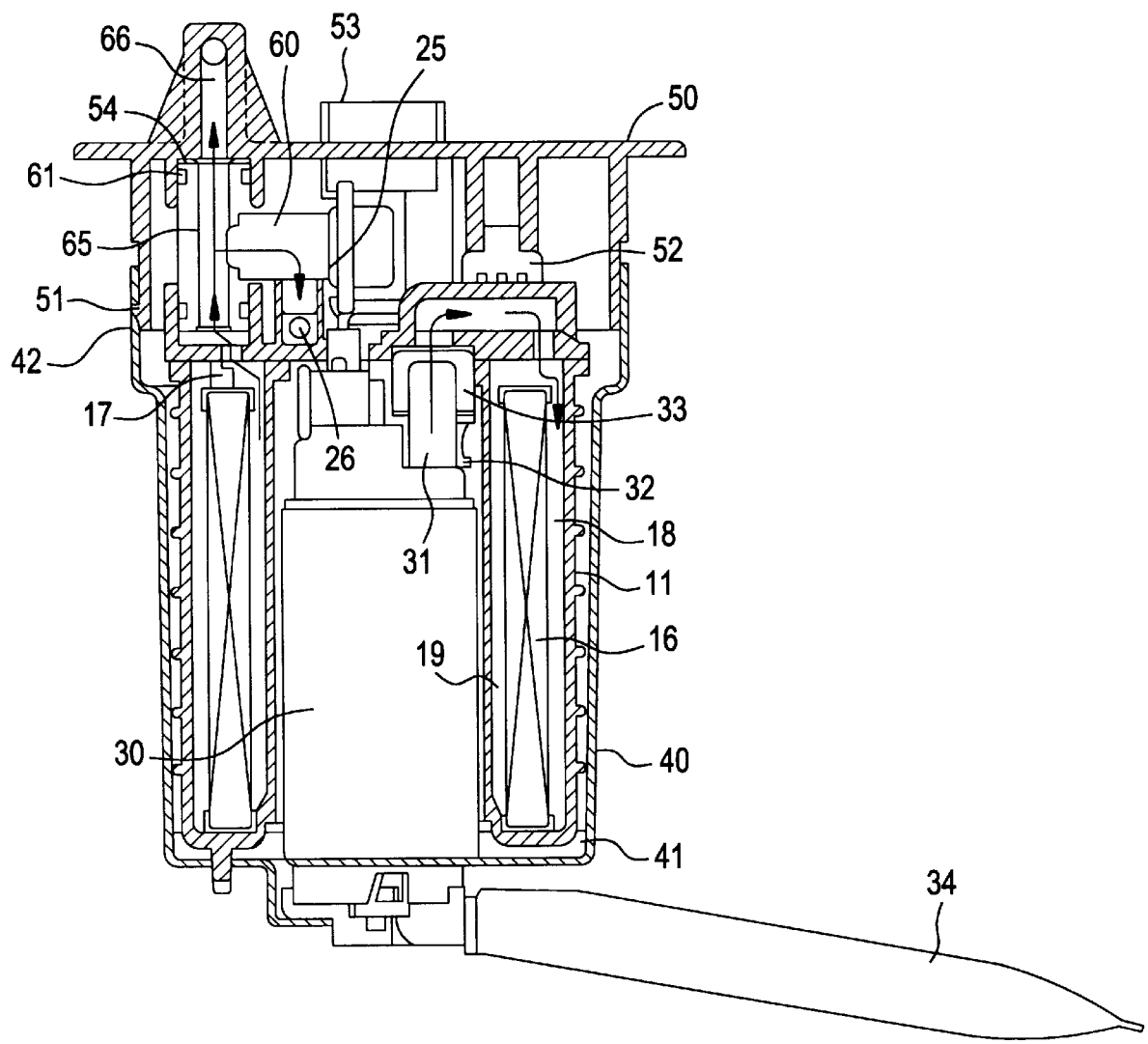
FIG. 5 is a vertical sectional view taken along line E—E of FIG. 4.
Figure 12:
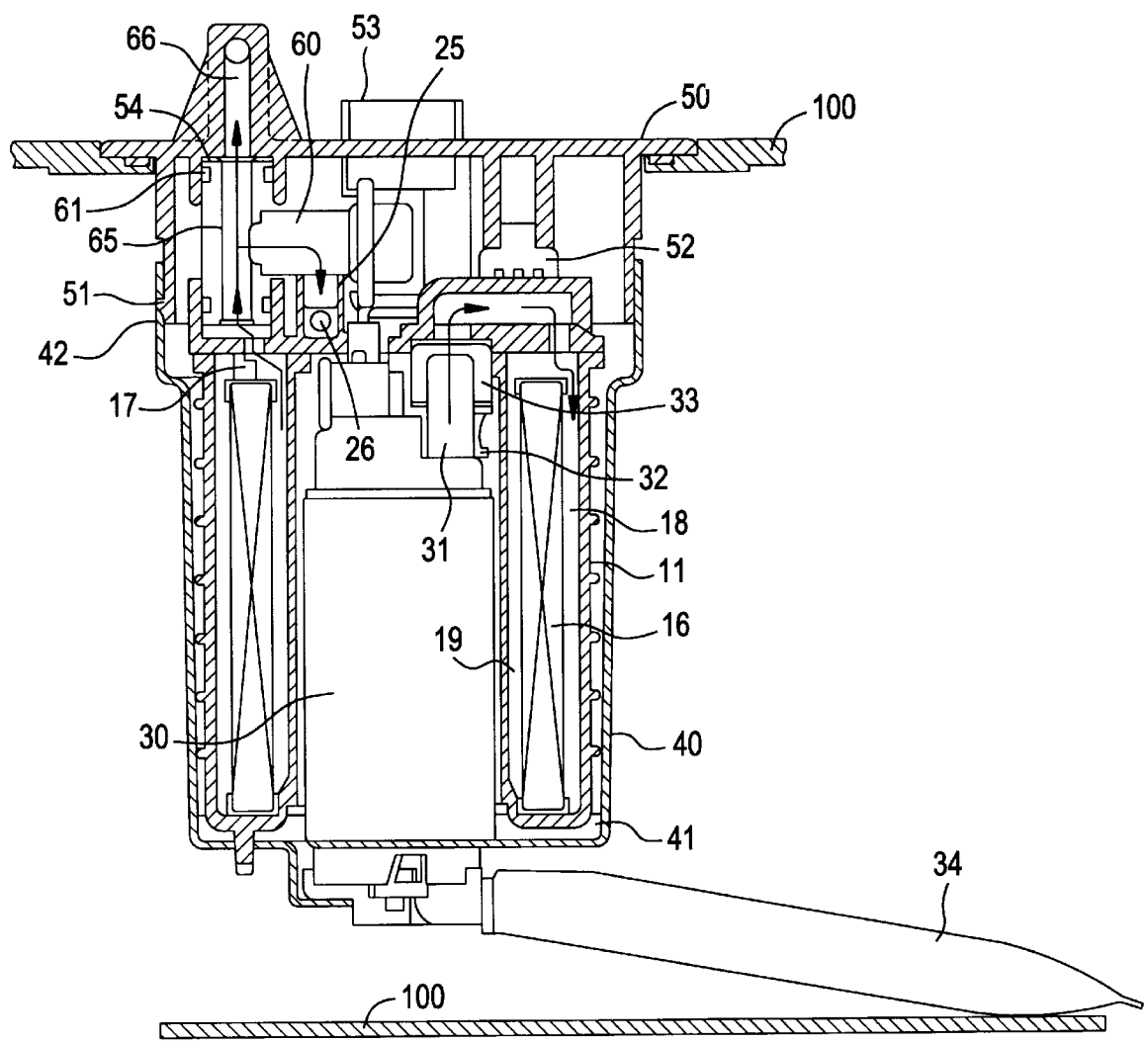
FIG. 12 shows a fuel filter of the first embodiment mounted in a fuel tank.

FIGS. 4 and 5 are views showing a pump module in which a fuel pump, a pressure regulator and other elements are assembled with the fuel filter of the first embodiment. FIG. 12 shows the fuel filter of FIG. 5 mounted in a fuel tank.

A fuel pump 30 is assembled with the fuel filter 10 by being inserted through the inserting port 15 of the filter case 11 into the pump inserting portion 14.

In this case, a delivery port 31 of the fuel pump 30 is connected by a spacer 32 and a bush 33 to the inlet mounting hole 20 of the filter case 11.

The filter case 11, in which the fuel pump 30 is assembled, is inserted through a cushion 41 into a housing 40. Then, a set plate 50 is mounted on the housing 40 by inserting an engaging portion 51 into an opening 42 provided in the housing 40. The cross-section of the housing 40 is formed into a D-shape to conform with the outline configuration of the filter case 11. By thus configuring the housing 40 in a D-shape, a sensor and other attachments can be inserted in the remaining space cut-out from a cylindrical configuration. Thus, a pump module containing the attachments can be inserted within the fuel tank 100 from an existing tank hole, as shown in FIG. 12. In addition to the D-shape, the shape of the housing 40 can be of a cylindrical shape or other shapes.

Before the set plate 50 is mounted on the housing 40, a pressure regulator 60 is mounted between the inlet mounting hole 24 provided in the filter case 11 and a mounting hole 54 provided in the set plate 50 via an O-ring 61. The mounting hole 54 communicates through a fuel path 66 with a main pipe fitting 67.

A fuel discharge port of the pressure regulator 60 is positioned facing to the return path 25. The discharge port of the pressure regulator 60 is connected either directly, or via connecting pipe, to the return path 25.

A cushion 52 is provided between the set plate 50 and the filter case 11.

A power terminal of the fuel pump 30 is connected to a power supply connector 53 mounted on the set plate 50.

Further, a suction filter 34 is connected to a suction port of the fuel pump 30.

The filter case 11 has projections for attaching the filter case to the housing 40.

As described above, the pump module, which includes a fuel filter 10 having the fuel pump 30 and the pressure regulator 60, is inserted through the tank hole into the fuel tank, and then the main pipe (not shown) is connected to the main pipe fitting 67. As shown in FIG. 12, the suction filter 34 is always in contact with the bottom surface of the fuel tank to thereby avoid electric charge buildup.

The operation of the module in which the fuel pump and the pressure regulator are assembled with the fuel filter of the first embodiment will now be described.

Fuel pumped by the fuel pump 30 is delivered to the pressure regulator 60 through the delivery port 31, the fuel path 21, the fuel inlet port 22, the fuel inlet chamber 18, the filter element 16, fuel outlet chamber 19, and the fuel outlet port 23. The pressure regulator 60 supplies the fuel to a fuel injector through the fuel path 66, the main pipe fitting 67, and the main pipe when the fuel pressure is below a predetermined value. On the other hand, the fuel is discharged from the fuel discharge port of the pressure regulator 60 when the fuel pressure exceeds the predetermined value.

The return fuel discharged from the pressure regulator is supplied to the return path 25, flows through the branch paths 26 branched from the return path 25, and is returned along the outside surface (inner outside periphery or outer outside periphery) of the filter case 11 to the fuel reservoir As described above, the return fuel discharged from the pressure regulator 60, flows through the fuel return passage including the return path 25 and the branch paths 26, and then is returned along the outside surface of the filter case 11 to the fuel reservoir. The return fuel flows down along the outside surface of the filter case 11, thereby reducing the amount of electric charge which may have been generated on the surface thereof.

The kinetic energy of the return fuel is reduced, because of the energy absorbing effect of the return path 25, energy distributing effect of the branch paths 26, and energy absorbing effect when the fuel flows down along the side surfaces of the filter case 11. Thus, fuel return sound waves are reduced in comparison with the case in which the return fuel is dropped into the fuel reservoir directly from a return pipe.

Embodiment 2

Figure 6:
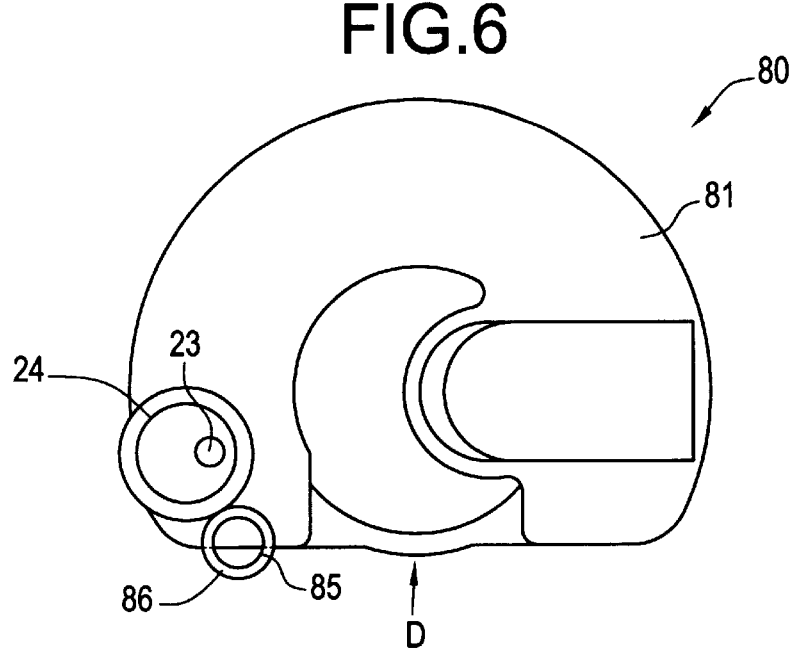
FIG. 6 is a plan view of a fuel filter constructed according to a second embodiment of the present invention.
Figure 7:
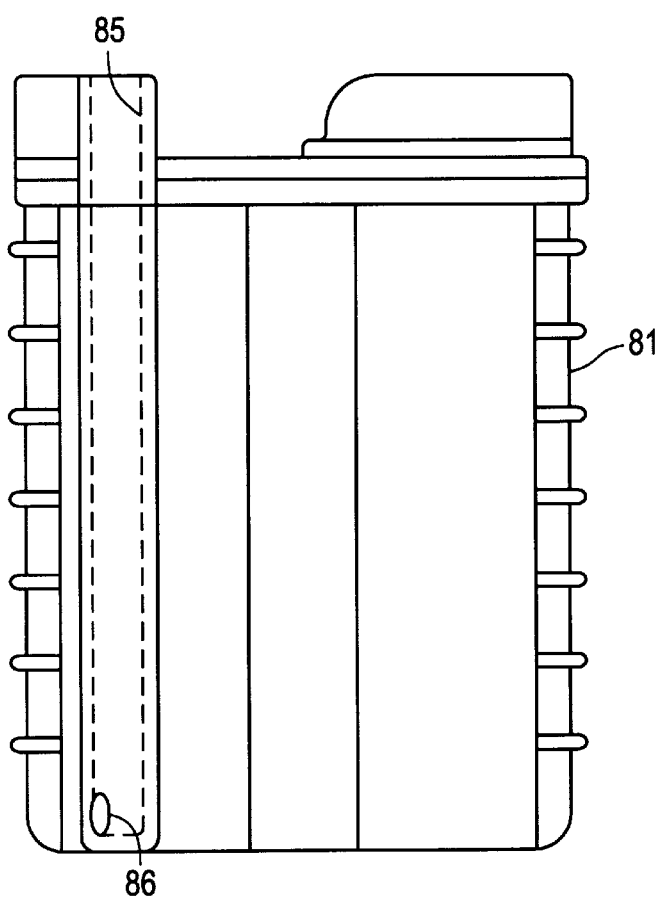
FIG. 7 is a view of the fuel filter of FIG. 6, looking in the direction of arrow D of FIG. 6.

In the first embodiment, the fuel return passage is provided on the upper surface of the filter case. However, the return path also can be provided along the outside surface of the filter case. Referring now to FIGS. 6 and 7, a fuel filter of this type will be described according to a second embodiment of the present invention.

As shown in FIGS. 6 and 7, a filter case 81 for a fuel filter 80 is provided with a return path 85 beginning at the top surface of the filter case 81 and extending along the outside peripheral surface thereof. The return path 85 has a circular cross section at the top of the filter case 81 and may be positioned opposite to or may be connectable to a discharge port of a pressure regulator. A portion of the return path 85 along the outside peripheral surface of the filter case 81 is formed to have a semicircular cross section. On a lower part of the side wall of the return path 85, a discharge port 86 is provided for discharging return fuel into the fuel reservoir. The return path 85 and the discharge port 86 constitute a fuel return passage.

Preferably, the return path 85 is formed of synthetic resin integrally with the filter case 81. Plural return paths 85 may be provided.

Other elements are the same as the fuel filter of the first embodiment shown in FIGS. 1 to 3, and therefore their description will not be repeated.

In the fuel filter of the second embodiment, the return fuel discharged from the pressure regulator 60 is returned to the fuel reservoir by the return path 85 provided along the outside peripheral surface of the filter case 81. The return fuel flows down along the return path 85, thus decreasing the electric charge generated on the surface of the filter case 81.

The kinetic energy of the return fuel is reduced when returned to the fuel reservoir through the return path 85, thereby reducing fuel return sound waves.

The cross-section of the return path 85 may be formed into various kinds of shapes other than a circle or a semicircle.

Embodiment 3

Figure 8:
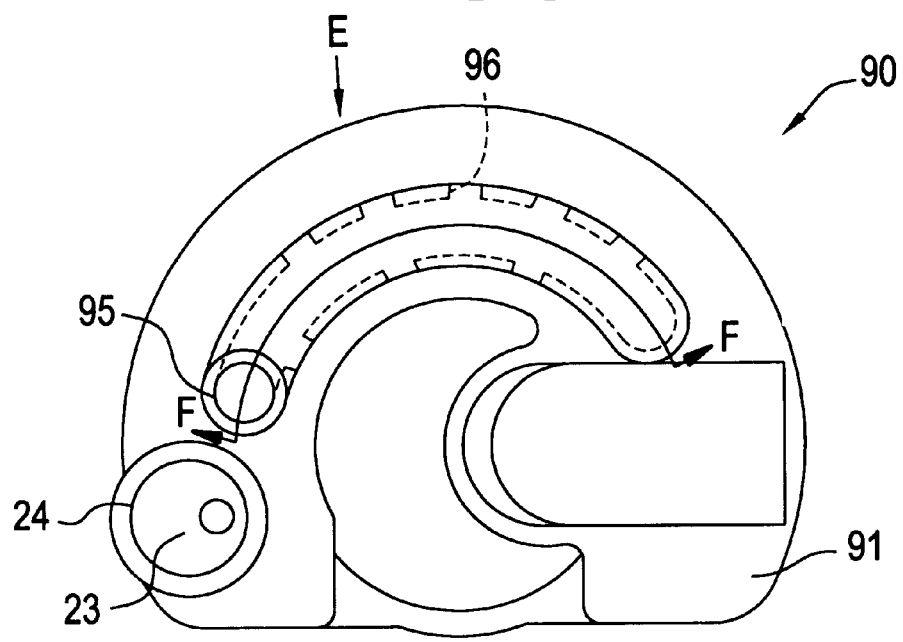
FIG. 8 is a plan view of a fuel filter constructed according to a third embodiment of the present invention.
Figure 9:
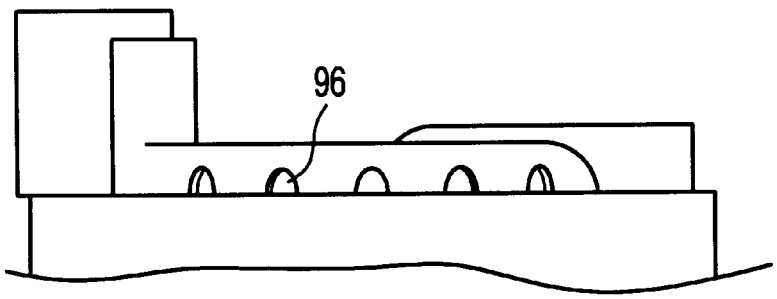
FIG. 9 is a view of the fuel filter of FIG. 8, looking in a direction of arrow E of FIG. 8.
Figure 10:
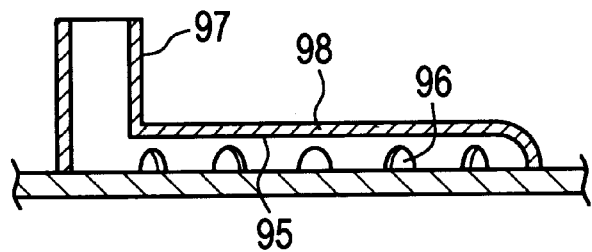
FIG. 10 is a sectional view of the fuel filter of FIG. 8, taken along line F—F of FIG. 8.

Referring now to FIGS. 8 to 10, a filter of a third embodiment of the present invention will be described.

As shown in FIGS. 8 to 10, a return path 95 is provided on the top surface of a filter case 91 of a fuel filter 90 so that the return fuel discharged from the pressure regulator may be fed along the top surface of the filter case 91. Branch paths 96 are branched from suitable positions along the return path 95.

Preferably, the return path 95 and the branch paths 96 are formed of synthetic resin or like materials integrally with the filter case 91.

In the fuel filter of the third embodiment, the return fuel discharged from the pressure regulator 60 is fed by the return path 95 along the top surface of the filter case 91, flows through the branch paths 96 branched from the suitable positions along the return path 95, and is returned to the fuel reservoir along the outside peripheral surface (inner outside periphery and outer outside periphery) of the filter case 91. Electric charge generated on the surface of the filter case 91 is reduced by having the return fuel flow along the return path 95 and down along the outside peripheral surface of the filter case 91. In this case, the branch paths 96 permit the return fuel flow to cover the entire outside peripheral surface of the filter case 91, thereby preventing electric charge from being concentrated locally on the surface of the filter case. Accordingly, the charge on the surface of the filter is further decreased.

The kinetic energy of the return fuel is also decreased when the return fuel is fed by the return path provided along the surface of the filter case, thus further reducing fuel return sound waves.

Guide walls 97 and 98 constituting the return path 95 are not limited to these shapes and any shapes are applicable thereto so long as the return fuel can be fed to the outside peripheral surface of the filter case 91. Configurations of the return path 95 and the branch paths 96 are variously modifiable.

Figure 11:
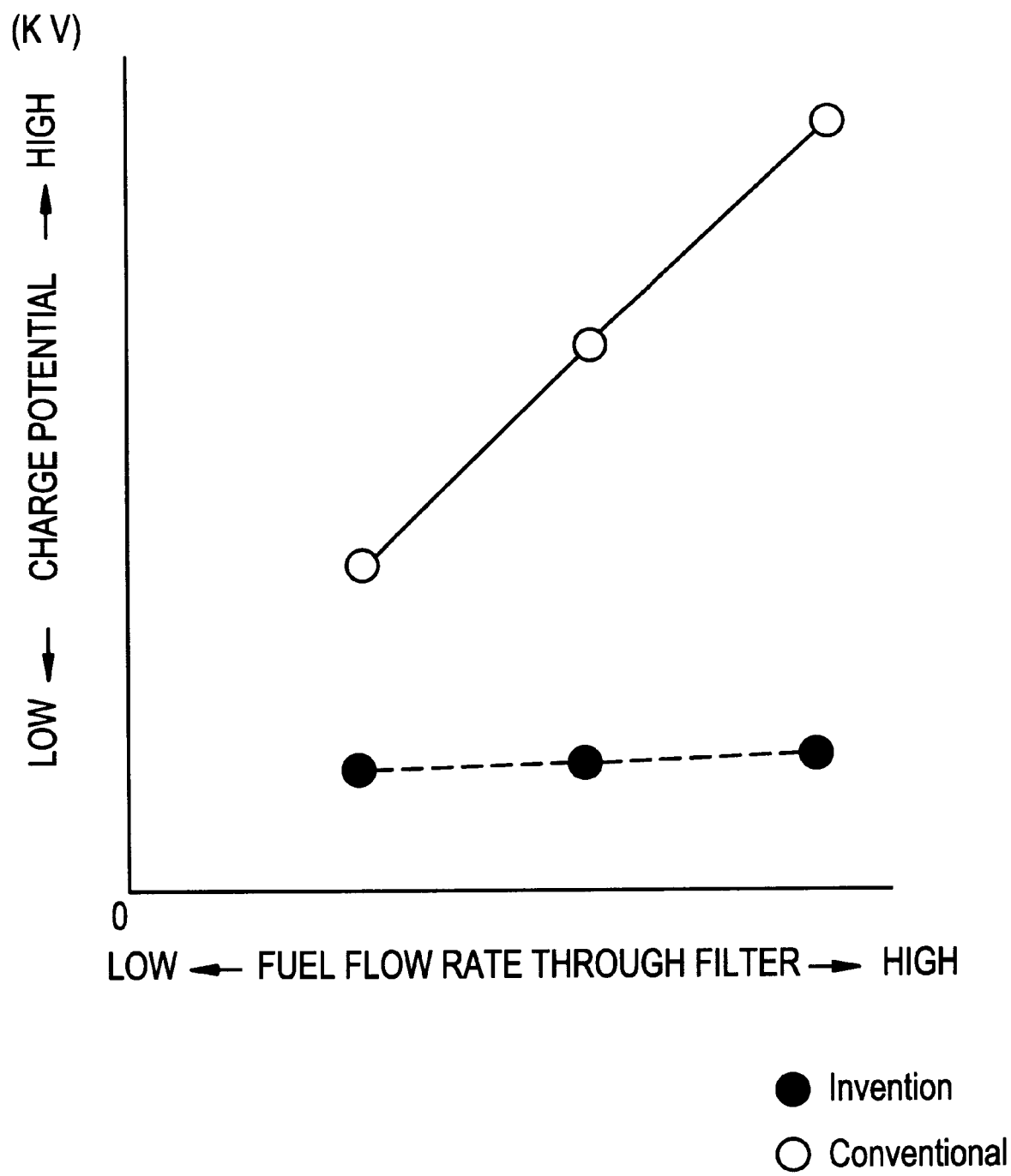
FIG. 11 is a graph showing the relationship between charging potential of the filter case and fuel flow rate through the filter for a fuel filter of the present invention and a conventional fuel filter.

FIG. 11 is a graph showing the relationship between fuel flow rate through the filter and the charging potential of the filter for a fuel filter of the present invention and a conventional fuel filter when only the suction filter is immersed into the fuel reservoir.

In FIG. 11, a solid line shows the results for the conventional fuel filter, which returns the fuel directly into the fuel reservoir. A dotted line shows the results for the fuel filter of the present invention, which returns the fuel along the outside peripheral surface of the filter case to the fuel reservoir.

As shown in FIG. 11, due to the electric charge buildup on the surface of the filter case, the charging potential is higher in the conventional fuel filter, which returns the fuel directly to the fuel reservoir. It is observed that the higher the fuel flow rate through the filter becomes, the higher the charging potential becomes.

On the other hand, in the fuel filter of the present invention, in which the return fuel flows along the outside peripheral surface of the filter case, electric charge does not readily build up on the surface of the filter case, and thus has a low charging potential even when the fuel flow rate through the filter becomes high.

In the above embodiments, the pump module is constructed by assembling the fuel pump and the pressure regulator with the fuel filter. However, the pump module may be constructed by assembling only the fuel pump with the fuel filter.

In this case, for example, the main pipe fitting and the return pipe fitting are connected to the set plate, and the main pipe fitting is connected through the fuel path to the mounting hole of the set plate. The filter case of the fuel filter, on which the fuel pump has been mounted, is inserted into the housing. And then, when the set plate is mounted on the housing, the fuel supply pipe is mounted between the outlet mounting hole of the filter case and the set plate mounting hole. The return fuel discharge port, which is connected to the return pipe fitting, is positioned opposite to the fuel return path or is connected to the fuel return path either directly or through the connecting pipe.

The cross-section of the housing of the fuel filter is formed into D-shape in the above embodiment, but it can be formed into a circle or other shape in accordance with the shape of the filter case.

Construction and mounting position of the fuel return passage are variously modifiable.

In addition, the present invention can be carried out in various modes modified by a person skilled in the art based up on their knowledge.

What is claimed is:

1. A fuel filter apparatus, comprising:
    a filter case comprising an outer periphery having a top surface and a bottom surface defined when the filter case is disposed in a generally vertical orientation, a fuel inlet port constructed and arranged to receive fuel from a fuel reservoir, a fuel outlet port constructed and arranged to provide filtered fuel to at least one fuel injector, a portion constructed and arranged to receive a fuel pump, and a fuel return path that integrally co-extends along the top surface of the filter case, the fuel return path constructed and arranged to receive surplus fuel that is discharged from the fuel outlet port but is not delivered to a fuel injector, and
    wherein branch paths extend from the fuel return path and are constructed and arranged to permit surplus fuel to flow along the outer periphery of the filter case to thereby return the surplus fuel to the fuel reservoir;
    a filter element disposed within the filter case between the fuel inlet port and the fuel outlet port; and
    a fuel pump disposed within the filter case portion for pumping fuel from the fuel reservoir to the fuel inlet port,
    whereby electric charge generated on the outer periphery of the filter case can be reduced.

2. A fuel filter apparatus as in claim 1, wherein the branch paths are disposed on the filter case such that the surplus fuel that is being returned to the fuel reservoir contacts the entire outer periphery of the filter case.

3. A fuel filter apparatus as in claim 1, additionally comprising a fuel pressure regulator mounted on the filter case in communication with the fuel outlet port and coupled to the fuel return path, wherein the fuel pressure regulator is constructed and arranged for sensing fuel pressure at the fuel outlet port and discharging fuel via the fuel return path along the outer periphery of the filter case to the fuel reservoir, if high fuel pressure is detected.

4. A fuel filter apparatus as in claim 1, wherein the filter case comprises an inner peripheral wall and an outer peripheral wall, the inner peripheral wall being a cylindrical peripheral wall that forms an interior space within the inner peripheral wall, the filter element being disposed between the inner peripheral wall and the outer peripheral wall and the fuel pump being disposed inside the inner peripheral wall, the fuel pump being constructed and arranged to force fuel from the fuel reservoir through the fuel inlet port into a fuel inlet chamber formed between the filter element and the outer peripheral wall, the fuel then passing through the filter element and entering a fuel outlet chamber formed between the filter element and the inner peripheral wall.

5. A fuel filter apparatus as in claim 1, further comprising a filter housing, wherein the filter case, fuel pump, fuel return path, branch paths and pressure regulator are disposed within the filter housing.

6. In combination:
    the fuel filter apparatus as in claim 5, further comprising a suction filter in communication with the fuel pump; and
    a fuel tank comprising the fuel reservoir;
    wherein the fuel filter apparatus is disposed within the fuel tank with the suction filter contacting a bottom surface of the fuel tank.

7. In combination:
    the fuel filter apparatus as in claim 1, further comprising a suction filter in communication with the fuel pump; and
    a fuel tank comprising the fuel reservoir;
    wherein the fuel filter apparatus is disposed within the fuel tank with the suction filter contacting a bottom surface of the fuel tank.

8. A fuel filter apparatus, comprising:
    a filter case having an outer periphery, a fuel inlet port and a fuel outlet port;
    a filter element disposed within the filter case between the fuel inlet port and the fuel outlet port;
    a fuel pump disposed within the filter case that pumps fuel from a fuel reservoir to the fuel inlet port; and
    means for returning surplus fuel discharged from the fuel outlet port, but not delivered to a fuel injector, to the fuel reservoir via the outer periphery of the filter case, whereby electric charge generated on the outer periphery of the filter case can be reduced,
    said means for returning surplus fuel comprising a return path integrally formed on a top surface of the filter case and branch paths extending from said return path and adapted to permit the surplus fuel to flow along the outer periphery of the filter case.

9. In combination:
    the fuel filter apparatus as in claim 8, further comprising a suction filter in communication with the fuel pump; and
    a fuel tank comprising the fuel reservoir;
    wherein the fuel filter apparatus is disposed within the fuel tank with the suction filter contacting a bottom surface of the fuel tank.

10. A fuel filter apparatus as in claim 8, further comprising a fuel pressure regulator in communication with the fuel outlet port and the surplus fuel returning means, wherein the fuel pressure regulator is constructed and arranged for sensing fuel pressure at the fuel outlet port and discharging surplus fuel to the fuel reservoir via the surplus fuel returning means, if high fuel pressure is detected.

11. A fuel filter apparatus, comprising:

a filter element, a fuel pump, and a filter case comprising a fuel inlet port adapted to receive fuel from a fuel reservoir, a fuel outlet port adapted to deliver filtered fuel to at least one fuel injector, a first space for receiving the fuel pump, a second space for receiving the filter element and a fuel return path that has a closed end on a top surface of the filter case, the fuel return path adapted to receive surplus fuel that is discharged from the fuel outlet port but is not delivered to the fuel injector and having branch paths extending from the fuel return path that are adapted to permit the surplus fuel that is exhausted through the branch paths to flow over the top surface and in contact with an outer surface of the filter case, whereby the surplus fuel is returned to the fuel reservoir and electric charge on the outer periphery of the filter is reduced.

12. A fuel filter apparatus as in claim 11, wherein the branch paths are disposed on the filter case such that the surplus fuel that is returning to the fuel reservoir can contact the entire outer periphery of the filter case.

13. A fuel filter apparatus as in claim 12, further comprising a fuel pressure regulator in communication with the fuel outlet port and the fuel return path, wherein the fuel pressure regulator is adapted to sense fuel pressure at the fuel outlet port and discharge the surplus fuel to the fuel reservoir via the fuel return path and branch paths if high fuel pressure is detected.

14. A fuel filter apparatus as in claim 13, further comprising a filter housing, wherein the filter case, fuel pump, fuel return path, branch paths and pressure regulator are disposed within the filter housing.

15. A fuel filter apparatus as in claim 14, wherein the filter case, return path and branch paths are integrally formed from synthetic resin.

16. In combination:

the fuel filter apparatus as in claim 15, further comprising a suction filter in communication with the fuel pump; and a fuel tank comprising the fuel reservoir;

wherein the fuel filter apparatus is disposed within the fuel tank with the suction filter contacting a bottom surface of the fuel tank.

* * * * *